J. BERG.
VEHICLE LAMP SUPPORTING CLAMP.
APPLICATION FILED DEC. 8, 1917.
1,300,328.
Patented Apr. 15, 1919.
3 SHEETS—SHEET 1.
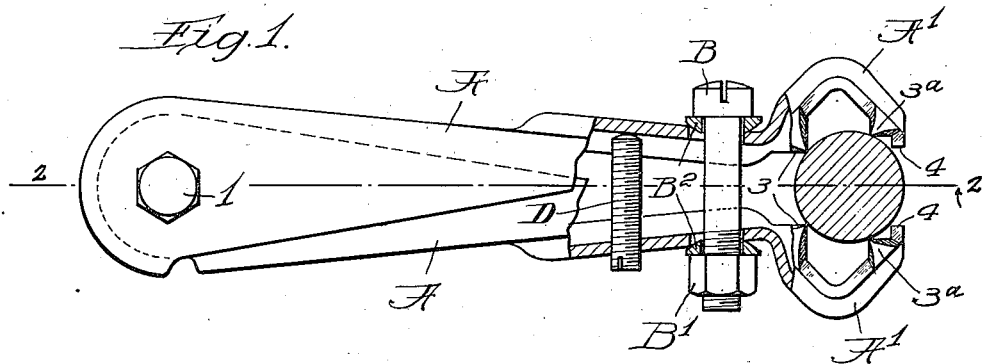
Fig. 1.
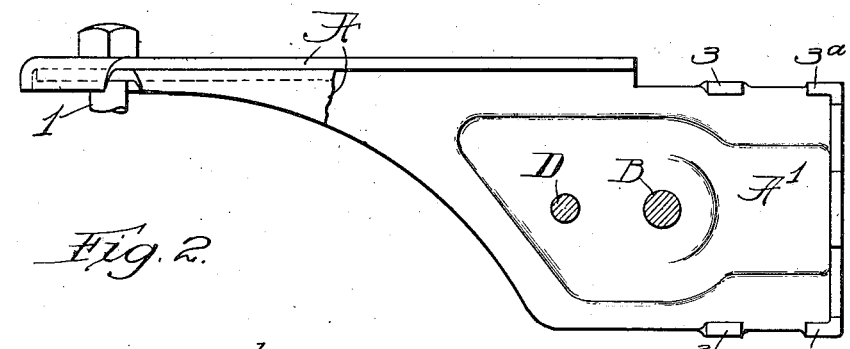
Fig. 2.
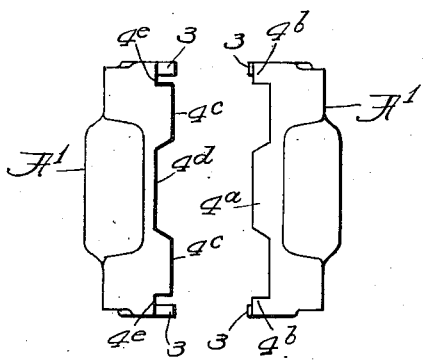
Fig. 3.
Fig. 4.
Inventor:
Joseph Berg.
by Burton and Burton
his Attys.
Witness:

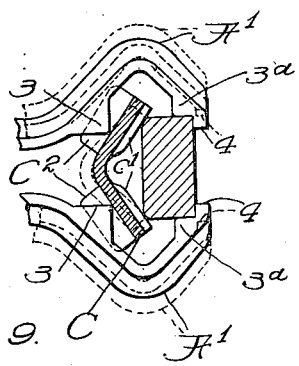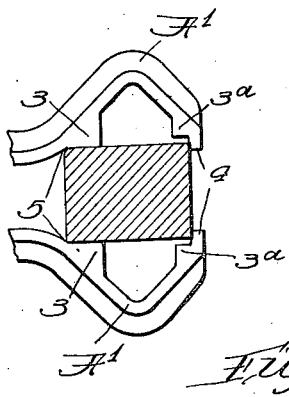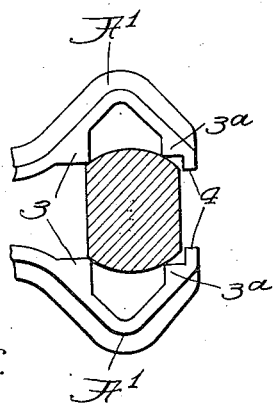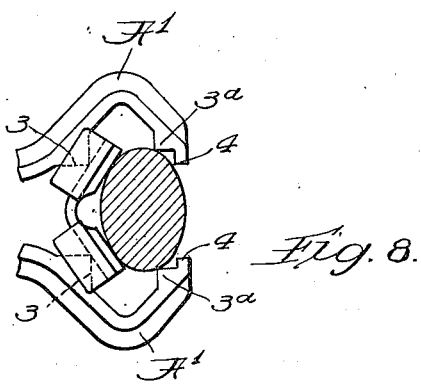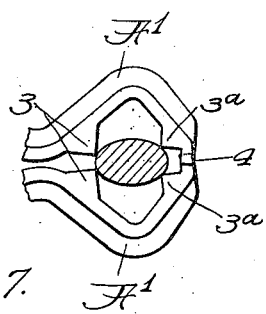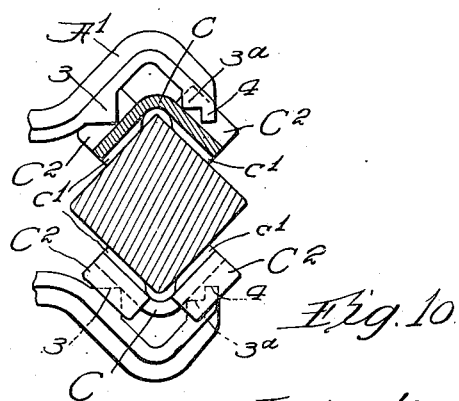

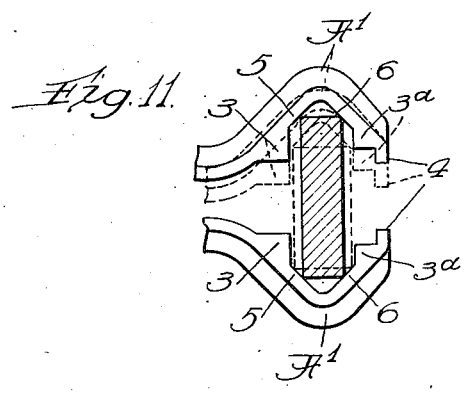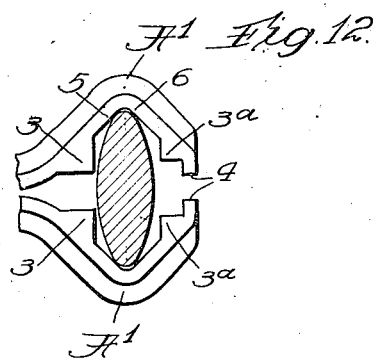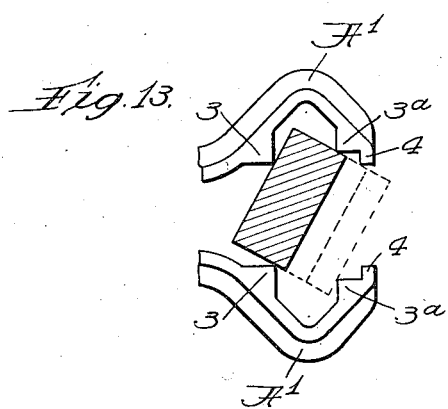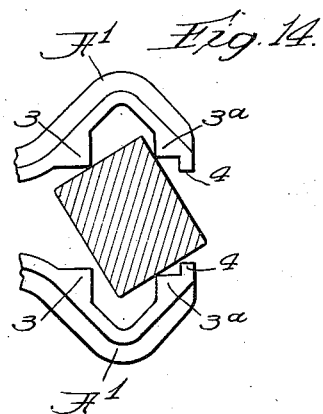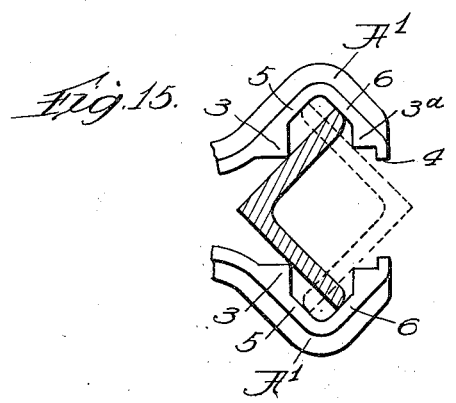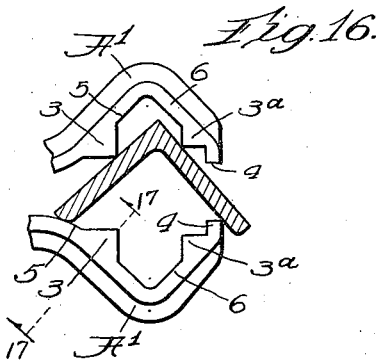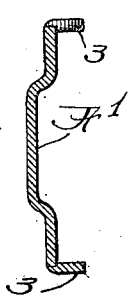

UNITED STATES PATENT OFFICE.

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

VEHICLE-LAMP-SUPPORTING CLAMP.

1,300,328.     Specification of Letters Patent.     Patented Apr. 15, 1919.

Application filed December 8, 1917. Serial No. 206,169.

*To all whom it may concern:*

Be it known that I, JOSEPH BERG, a citizen of the United States, residing at Chicago, in the county of Cook and the State of Illinois, have invented certain new and useful Improvements in Vehicle-Lamp-Supporting Clamps, of which the following is a specification, reference being had to the accompanying drawings, forming a part thereof.

The purpose of this invention is to provide an improved clamp for securing an object to be supported, such as a vehicle lamp, to a post or bar by which it is to be carried. It consists in the elements and features of construction shown and described, as indicated in the claim.

In the drawings:

Figure 1 is a plan view of a clamp embodying this invention, the same being shown clamped upon a supporting post, represented in section.

Fig. 2 is a section at the line, 2—2, on Fig. 1.

Fig. 3 is an end elevation of the clamping jaws.

Fig. 4 is a perspective of a removable supplemental jaw piece.

Figs. 5, 6 and 7 are views similar to Fig. 1 as to the clamping end portions of the jaws, showing posts of different cross-section engaged by the clamp.

Figs. 8, 9 and 10 are similar views showing the auxiliary supplemental jaw piece employed in the clamping jaws for clamping posts of different cross-section.

Figs. 11, 12, 13, and 14 are similar views to the preceding showing posts of different cross-sections engaged by the jaws with the clamp-arms extending from the posts at different angles from that shown in the other figures presenting posts of the same cross sections respectively.

Figs. 15 and 16 are similar views showing the clamp applied to a post angle-shaped or L-shaped in cross-section.

Fig. 17 is a section at the line, 17, 17, on Fig. 16.

The clamp shown in the drawings comprises two members, A, A, pivoted together at 1, for swinging toward and from each other at their gripping ends or jaws $A^1$. B is a clamping bolt for forcing and securing the jaws in clamped relation to the support. The bolt is provided with a nut, $B^1$, and spheriodal-faced washers, $B^2$, $B^2$, for engaging reciprocally-formed seats on the clamp members, A, A. The characteristic of the invention consists in contour of the jaw faces, adapting them to engage supports of different cross-section and in different positions with respect to the cross-section,—that is, with the clamp-arms extending off at different angles, as illustrated in the different views. For this purpose each of the jaws, which are similar in respect to their gripping faces, has situated symmetrically with respect to the line of approach of the jaws, two angular teeth, 3 and $3^a$, one of each at the lower and one at the upper edge of the jaw. These teeth are formed preferably by folding inward at right angles to the plane of the blank or plate of which the jaw is made, an angularly lug formed in the cutting of the blank, as will readily be understood from the figures of the drawing. The rear teeth, 3, are desirably larger than the forward teeth, $3^a$. The two edges of these teeth of both sizes are preferably at right angles to each other, one edge being substantially longitudinal of the clamp as a whole and the other substantially directly transverse thereof. Beside these teeth, 3 and $3^a$, each jaw has at its forward vertical edge, a lip or flange, 4, folded to project inwardly toward the lip or flange of the opposite jaw, and making a right angle with the adjacent edges of both of the forward teeth, $3^a$. The jaws, $A^1$, $A^1$, from which these teeth, 3 and $3^a$, project as described, are each formed by folding the sheet metal plate or blank of which the jaw is made at substantially a right angle at a vertical line, the two right angles of the two jaws opening toward each other in the assembled clamp, and the teeth mentioned being projections into the space embraced between these two facing right-angular jaws; and the clamp is therefore adapted to grip by the four angular teeth at the upper and lower edges of these jaws,—that is, by eight teeth in all,—a post of almost any symmetrical contour which is introduced between the jaws, the angular teeth of the jaws being adapted to bite into the substance of such post and so hold it firmly to prevent the clamp from turning or swinging on the post, or slipping longitudinally of the clamp or of the post. In addition to the angular points of these teeth, 3 and $3^a$, for holding the post, the device is adapted to grip firmly posts of certain forms and dimensions by engagement in the angle between the teeth and the faces of the clamp jaws from which they are to project. Also the angle formed between the two faces of each jaw, said angles facing each other as stated, adapts the jaw to hold certain forms of post by the symmetrical grip afforded by the right-angular jaws themselves, independently of the grip which may be afforded by the engagement of the teeth or of the angles between the teeth and the jaw faces. The varieties of engagement and the various forms of posts which are adapted to be engaged, and the various angles at which they may be thus engaged are illustrated in the different figures of the drawing. In Fig. 1, as stated, there is shown the engagement of a cylindrical post, all four of the teeth, $3^a$, at each edge of the jaw, being engaged with the cylindrical surface of the post, and gripping it firmly against turning or slipping. In Fig. 5 there is shown an oblong rectangular post of such dimensions that it is adapted to be gripped between two of the longitudinal edges of the rear or larger teeth, 3, and stopped at its forward side against the flanges, 4, its stoppage in the opposite direction being effected by its lodgment in the angle between said longitudinal edges of the teeth, 3, and the adjacent face 5, of the jaw from which said tooth projects. In Fig. 6 there is shown a post which is cylindrical with oppositely parallel flattened sides, that is, a segment of the cylindrical form being cut away at each side, the cylindrical form being of greater diameter than that shown in Fig. 1, but the cylindrical surfaces being gripped in the same manner by all four teeth at each of the jaw edges. Fig. 7 illustrates the engagement of the clamp by means of all four of the teeth, $3^a$, with a small post of oval cross-section, with the lesser diameter transverse, so that the jaws close together quite closely in order to grip it. In order to permit the jaws to engage a post of small cross-section as shown in this figure, the flanges, 4 which, but for the modification about to be described, would meet and limit the closing together of the jaws before the teeth could grip so small a post, are reciprocally notched as shown in Fig. 3 for interlocking with each other so as to permit the jaws to come as much closer together than they otherwise would as the depth of their interlocking parts, one of the jaws by this expedient having the lip consisting of three remnants, $4^a$, at the middle, and $4^b$, $4^b$, at the opposite ends; and the other jaw consists of two remnants, $4^c$, $4^c$, separated by the notch, $4^d$, and the notches, $4^e$, $4^e$, which receive the said remnants, $4^b$, from the opposite jaw.

Figs. 11 and 12 show the clamp engaged with posts of oblong cross-section, the longer dimension extending cross-wise of the clamp, the engagement being effected by the faces, 5 and 6, of the angular jaws themselves without regard to the teeth or to the angles between said teeth and said faces. Figs. 13 and 14 show the engagement of the clamp with posts of certain oblong cross-section, the clamp extending from the posts obliquely with respect to the bases of the posts, the engagement being rendered secure against turning and slipping by the relation of three points of the engagement. In Figs. 15 and 16 there are shown posts of angle or L-shaped cross-section, engaged by the clamp projecting at various angles from the post, the dotted line positions in certain of these figures showing how the clamp may engage in this manner for L-shaped posts of different dimensions and extend therefrom at the different angles.

The supplemental or auxiliary jaw piece, C, is to be employed for facilitating clamping on posts of certain cross-sections and dimensions, and at certain angles, which cannot be securely accomplished by the clamping jaws without this auxiliary jaw piece, or which can be clamped more securely by the aid of the auxiliary piece. This auxiliary jaw piece is made of metal plate folded originally at a right angle as it is seen in Fig. 10, both flanges or wings being ribbed or corrugated as seen at $c^1$, both for stiffening the jaws and for affording engagement with the teeth, 3 and $3^a$, of the jaws with said jaw pieces, to position the latter vertically and give the teeth better or more secure engagement with said jaw pieces. Both wings of the jaw pieces are further stiffened by having their ends folded outwardly, forming lugs, $C^2$, $C^2$. As stated, these supplemental auxiliary jaw pieces are originally made right angular in form, but they are adapted to be spread to a larger angle by the pressure which it experienced in clamping. It is by this means that they are particularly adapted to accommodate themselves to the various dimensions and forms of posts upon which the device may be clamped by the aid of these auxiliary jaw pieces. In Fig. 10 they are shown in their normal form, right-angular, for engaging a square post, so that the clamps will extend in the direction of one of the diagonals of the post. In Figs. 8 and 9 they are shown employed for engaging a post oblong in cross-section with its longer dimension transverse to the length of the clamp. In this form, it will be obvious at once that the auxiliary jaw will need to be spread to a wider angle than right-angle. Such spreading may be partly accomplished before it is put in place, but in the completion of the process of clamping it upon the post, the auxiliary jaw piece will be spread to whatever angle is necessary in order to permit the jaws of the clamp to be closed together so far that the teeth, 3ª, will engage the post. The process of clamping and resultant spreading of the angle of the jaw piece may be understood from the dotted line representation in Fig. 9 which shows the position of the parts when the clamp is first applied to the post as before, it is closed together so as to properly grip it, and the same process of spreading the angle of the auxiliary jaw piece may be understood from the dotted line representation.

It will be observed that the fact that the two jaws are hinged together about a single pivot and swing therefore in arc of a circle about that pivot, causes the opposed teeth, 3, 3, and 3ª, 3ª, to approach each other in arcs of a circle, and not in lines at right angles to a plane bisecting the angle of divergence or convergence of the jaws; and that therefore, the various positions of the vertical plane of the points of the four teeth of either jaw are not parallel to each other; so that in closing the jaws upon similar posts of different sizes, the front and rear teeth will not engage those different sizes in precisely similar manner; and in gripping posts having opposite sides parallel, difficulty may be experienced in obtaining secure engagement of the forward and rear teeth at the same time, except upon posts of certain dimensions. This difficulty is in large part and sufficiently overcome by taking advantage to some extent of the slight flexibility of the two members of the clamp, and providing at a point back of the position of the clamping bolt, B, a fulcrum screw, D, which is screwed through one of the jaws and impinges against the inner surface of the other, as seen clearly in Fig. 1. If in closing the clamp together upon a given post, the rear or inner teeth engage the post and tend to stop the clamping action before the forward or outer teeth have reached the post, the fulcrum screw, D, may be screwed in so as to spring the arms, or rather, so that in drawing tight the clamping bolt, B, both arms will be sprung or flexed over the points of their engagement with the fulcrum bolt, B; with the effect that the forward or outer teeth will be carried in a little farther or faster than the rear or inner ones, so that engagement of all the teeth may be effected at the same time. Thus by means of the two bolts, B and D, the clamping engagement may be made very secure in cases in which otherwise it would be difficult to obtain more than two points or lines of engagement.

I claim:—

1. A clamp comprising two jaw members pivotally connected for swinging apart and toward each other; jaws rigid with said members respectively, having their faces toward each other each deeply recessed, each jaw having at each side of the recess an angular tooth, said teeth consisting of inwardly projecting lugs at the upper and lower edges of the jaw.

2. A clamp comprising two jaw members pivotally connected for swinging apart and toward each other; jaws rigid with said members respectively, having their faces toward each other deeply recessed, each jaw having at each side of the recess an angular tooth, the outer ends of the jaws having flanges projecting toward each other and making similar angles with the adjacent edges of said teeth on said jaws respectively.

3. A clamp comprising two jaw members pivotally connected for swinging apart and toward each other; jaws rigid with said members respectively, means for forcing the jaws toward each other, consisting of a clamping bolt set through the clamp members between the jaws and their pivotal connections, and a fulcrum bolt mounted between said clamping bolt and the clamp pivot, suitably engaged with said clamp members for crowding them apart at the point at which said fulcrum bolt is situated.

4. A clamp comprising two jaw members pivotally connected for swinging apart and toward each other; jaws rigid with said members respectively, having their faces toward each other deeply recessed, each jaw having at each side of the recess an angular tooth, and auxiliary jaw piece comprising a plate of angle form, adapted to be positioned between the jaws and engaged at opposite sides of its angle by two of the teeth of said jaws, and to engage the post at two points by its inner faces respectively, said jaw piece being adapted to have its angle changed by the pressure of the post against it at said points for clamping.

5. In a structure such as set out in the last claim foregoing, said auxiliary jaw piece having corrugations for engagement of the teeth on the clamp jaws and the back side of said auxiliary jaw.

In testimony whereof, I have hereunto set my hand at Chicago, Illinois, this 30th day of November, 1917.

JOSEPH BERG.